(12) United States Patent
Bennett et al.

(10) Patent No.: US 10,696,165 B2
(45) Date of Patent: Jun. 30, 2020

(54) RANGE EXTENDER CONTROL

(71) Applicants: Asher Bennett, Brentwood (GB); Moria Bennett, Brentwood (GB); John Hankinson, Felixstowe (GB); Malcolm Powell, Norwich (GB); Trevor Power, Leamington Spa (GB); Robert Watson, Olney (GB); Zhengye Zhu, Guangzhou (CN)

(72) Inventors: Asher Bennett, Brentwood (GB); Moria Bennett, Brentwood (GB); John Hankinson, Felixstowe (GB); Malcolm Powell, Norwich (GB); Trevor Power, Leamington Spa (GB); Robert Watson, Olney (GB); Zhengye Zhu, Guangzhou (CN)

(73) Assignee: TEVVA MOTORS LIMITED, Brentwood Essex (GB)

(*) Notice: Subject to any disclaimer, the term of this patent is extended or adjusted under 35 U.S.C. 154(b) by 0 days.

(21) Appl. No.: 14/651,624

(22) PCT Filed: Dec. 12, 2013

(86) PCT No.: PCT/GB2013/053281
§ 371 (c)(1),
(2) Date: Jun. 11, 2015

(87) PCT Pub. No.: WO2014/091238
PCT Pub. Date: Jun. 19, 2014

(65) Prior Publication Data
US 2015/0298555 A1    Oct. 22, 2015

Related U.S. Application Data

(60) Provisional application No. 61/736,050, filed on Dec. 12, 2012.

(51) Int. Cl.
*B60L 50/62*    (2019.01)
*B60L 11/12*    (2006.01)
(Continued)

(52) U.S. Cl.
CPC ............ *B60L 11/123* (2013.01); *B60L 1/003* (2013.01); *B60L 1/02* (2013.01); *B60L 1/14* (2013.01);
(Continued)

(58) Field of Classification Search
CPC ........ B60L 11/22; B60L 11/123; B60L 50/62; B60L 58/12
(Continued)

(56) References Cited

U.S. PATENT DOCUMENTS 8,020,651 B2 *  9/2011  Zillmer .................. B60K 6/48
                                                    180/65.285
9,266,524 B2 *  2/2016  Lutz ..................... B60L 11/1862
(Continued)

FOREIGN PATENT DOCUMENTS

EP       2 141 043 A1    1/2010
WO    WO 2011/019133 A2   2/2011
(Continued)

OTHER PUBLICATIONS

European Patent Office, "Search Report" in application No. PCT/GB2013/053281, dated Oct. 6, 2014, 8 pages.
(Continued)

*Primary Examiner* — Charles A Fox
*Assistant Examiner* — Michael E Butler
(74) *Attorney, Agent, or Firm* — Hickman Palermo Becker Bingham LLP; Malgorzata A. Kulczycka

(57) ABSTRACT

This invention relates to an apparatus for controlling a range extender (104) in an electric vehicle (100). The apparatus comprises means for receiving trip information, means for
(Continued)

retrieving power usage information relating to a previous trip, the previous trip having trip information which is at least in part in common with the trip information; and means for activating the range extender (104) in dependence on said power usage information. The invention also extends to an associated method, computer product and system.

10 Claims, 11 Drawing Sheets

(51) Int. Cl.
| | |
|---|---|
| *B60L 15/20* | (2006.01) |
| *B60L 7/18* | (2006.01) |
| *B60L 1/00* | (2006.01) |
| *B60L 1/14* | (2006.01) |
| *B60L 3/00* | (2019.01) |
| *B60L 1/02* | (2006.01) |
| *B60L 3/12* | (2006.01) |
| *B60L 50/61* | (2019.01) |
| *B60L 58/12* | (2019.01) |
| *B60L 53/14* | (2019.01) |
| *B60L 58/40* | (2019.01) |
| *B60L 58/13* | (2019.01) |
| *B60L 58/16* | (2019.01) |

(52) U.S. Cl.
CPC ............... *B60L 3/0046* (2013.01); *B60L 3/12* (2013.01); *B60L 7/18* (2013.01); *B60L 15/2045* (2013.01); *B60L 50/61* (2019.02); *B60L 50/62* (2019.02); *B60L 53/14* (2019.02); *B60L 58/12* (2019.02); *B60L 58/13* (2019.02); *B60L 58/16* (2019.02); *B60L 58/40* (2019.02); *B60L 2240/12* (2013.01); *B60L 2240/16* (2013.01); *B60L 2240/34* (2013.01); *B60L 2240/421* (2013.01); *B60L 2240/441* (2013.01); *B60L 2240/60* (2013.01); *B60L 2240/622* (2013.01); *B60L 2240/642* (2013.01); *B60L 2240/662* (2013.01); *B60L 2240/70* (2013.01); *B60L 2250/16* (2013.01); *B60L 2260/44* (2013.01); *B60L 2260/52* (2013.01); *B60L 2260/54* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/72* (2013.01); *Y02T 10/7283* (2013.01); *Y02T 10/7291* (2013.01); *Y02T 90/14* (2013.01); *Y02T 90/16* (2013.01); *Y02T 90/162* (2013.01); *Y02T 90/34* (2013.01)

(58) Field of Classification Search
USPC .......................................................... 701/22
See application file for complete search history.

(56) References Cited

U.S. PATENT DOCUMENTS

| | | | |
|---|---|---|---|
| 9,413,182 B2 * | 8/2016 | Park ..................... | B60L 58/16 |
| 2002/0107618 A1 | 8/2002 | Deguchi et al. | |
| 2003/0006076 A1 * | 1/2003 | Tamor ................... | B60W 10/06 180/65.25 |
| 2008/0262668 A1 | 10/2008 | Yamada | |
| 2010/0152937 A1 | 6/2010 | Yamada et al. | |
| 2011/0246010 A1 * | 10/2011 | de la Torre Bueno .. | B60K 6/46 701/22 |
| 2011/0298624 A1 * | 12/2011 | Bauman .................... | H02J 7/14 340/636.1 |
| 2013/0030670 A1 * | 1/2013 | Tomik ................... | B60W 10/06 701/102 |
| 2013/0113277 A1 * | 5/2013 | Kim ..................... | H01M 10/425 307/9.1 |
| 2014/0114514 A1 * | 4/2014 | Crombez .............. | B60W 10/06 701/22 |
| 2016/0107537 A1 * | 4/2016 | Marchal ................ | B60L 58/12 429/50 |

FOREIGN PATENT DOCUMENTS

| | | | | |
|---|---|---|---|---|
| WO | WO 2012085295 A1 * | 6/2012 | ............. | B60L 11/14 |
| WO | WO 2014/091238 A2 | 6/2014 | | |

OTHER PUBLICATIONS

European Patent Office, "Search Report" in application No. 13 821 706.2-1205, dated Jun. 13, 2018, 7 pages.
State Intellectual Property Office of People's Republic of China, "Office Action" in application No. 201380065408.0, dated May 8, 2017, 5 pages.
Current Claims in China application No. 201380065408.0, dated May 2017, 3 pages.

* cited by examiner

RANGE EXTENDER CONTROL

FIELD OF INVENTION

This invention relates to an apparatus and method for controlling a range extender of an electric vehicle, and to associated vehicles and systems.

BACKGROUND

Electric vehicles take a variety of forms, namely pure electric (where the only source of power is a battery), parallel hybrid (where an internal combustion engine or battery may drive the wheels), or series hybrid vehicles where a secondary power source re-charges an on-board battery (a range extender). The present invention is primarily concerned with the latter.

One known approach for operating vehicles with a 'dual fuel' range extending functionality is shown in FIG. 3 (referred to as the 'basic model'). Using this approach, the vehicle is operated purely as an electric vehicle until a predetermined level of charge is reached, at which point the range extender is switched on—and will remain on—until an upper state of charge (SOC) level is reached.

In this basic model, the range extender (RE) is switched on at full power when the SOC reaches the lower threshold; charge is then increased until the upper threshold is reached. The on time of the range extender is indicated by 'RE State' 1 being fully on, and 0 being off. This is sometimes referred to as charge depleting/charge sustaining modes (this is a baseline example with another possibility being when the charge sustaining mode is on at less than full power e.g. at efficient power).

The basic model is inefficient because the range extender is typically only used at maximum power (as opposed to where it is most efficient), it does not take into account the most opportune times for range extender usage (only taking into account SOC) and the battery pack will have surplus charge available at the end of the journey (partly generated by the range extender) that could have been used during the discharge cycle. This unused power generated by the range extender will be inherently more expensive than plug in power from the grid. An improved solution is therefore required.

The present invention aims to alleviate at least some of the aforementioned problems.

According to one aspect of the present invention there is provided an apparatus for controlling a range extender in an electric vehicle, the apparatus comprising: means (such as a suitably programmed processor and associated memory) for receiving trip information; means (such as a suitably programmed processor and associated memory) for retrieving power usage information relating to a previous trip, the previous trip having trip information which is at least in part in common with the trip information; and means (such as a suitably programmed processor and associated memory) for activating the range extender in dependence on said power usage information.

The apparatus may further comprise means (such as a suitably programmed processor and associated memory) for determining a power usage plan for said trip in dependence on the retrieved power usage information, and preferably the activating means is adapted to activate the range extender in dependence on said power usage plan.

The power usage plan may comprise an activation schedule.

The activating means may be operable to control the power of the range extender in dependence on the activation schedule.

The power usage plan may comprise a state of battery charge plan for the trip.

The activating means may be operable to control the power of the range extender in dependence on the state of charge plan.

The power usage information may comprise an activation schedule.

The power usage information may be from a local memory.

The power usage information may be determined from externally-sourced trip information.

The power usage information may be from an external data source.

The retrieved power usage information may comprise crowd-sourced power usage information.

The power usage information may comprise information from a logistics database.

The apparatus may further comprise means (such as a suitably programmed processor and associated memory) for determining the state of charge of an on-board battery.

The activation means may be operable to activate the range extender so as to maintain a state of charge of the electric vehicle, preferably in accordance with a state of charge plan.

The state of charge may be maintained so as to follow a linear decrease.

The means for determining the state of charge may be operable to detect charge gradients.

The activation means may be operable to control the power output of the range extender.

The activation means may be adapted to activate the range extender at a low power.

The trip information may comprise a time and/or length of a trip.

The trip information may comprise trip itinerary information.

The apparatus may further comprise telemetry instrumentation, and preferably the receiving means is adapted to receive trip information from the telemetry instrumentation.

The activating means may be operable in dependence on the trip information received from the telemetry instrumentation.

The trip information received from the telemetry instrumentation may comprise a location of the apparatus.

The activation means may be adapted to operate in dependence on the location of the apparatus and a state of charge of an on-board battery.

The received trip information may comprise route information.

The route information may comprise a set of waypoints.

The route information may comprise topographic information.

The trip information may comprise expected speed information.

The trip information may comprise traffic information.

The trip information may comprise non-driving load information.

The non-driving load information may comprise at least one of: heater energy usage, headlight usage, on-board electronics usage, and windshield wiper usage.

The trip information may comprise driver characteristics.

The trip information may comprise payload information.

The trip information may comprise weather information.

The trip information may comprise recharge opportunities.

The apparatus may further comprise means (such as a suitably programmed processor and associated memory) for recording power usage and/or or telemetry information.

The apparatus may further comprise means (such as a suitably programmed processor and associated memory) for uploading power usage information and/or telemetry information to a server.

According to another aspect of the present invention there is provided a range-extended vehicle comprising an apparatus as herein described, preferably connectable to a battery pack, a range extender and an electric motor.

The vehicle may be in the form of a delivery vehicle.

According to another aspect of the present invention there is provided a fleet of vehicles as herein described.

According to another aspect of the present invention there is provided a method for determining a power usage plan for a range-extended electric vehicle, the method comprising: receiving trip telemetry; retrieving power usage information relating to a previous trip, the previous trip having trip information which is at least in part in common with the trip telemetry information; and determining a power usage plan to be associated with said trip telemetry in dependence on the retrieved power usage information.

The trip telemetry may comprise at least one of: location, speed, acceleration, elevation, time of day, driver characteristics, and weather.

The power usage plan may be updated when the trip telemetry does not match the power usage plan.

The method may further comprise uploading said trip telemetry information and/or power usage information to a server.

According to another aspect of the present invention there is provided a computer program product adapted to carry out the method described herein.

The computer program product may be in the form of a software application adapted to be executed on a portable computing device.

According to another aspect of the present invention there is provided a system comprising: at least one vehicle as herein described; and a server operable to transmit and/or receive trip information and/or power usage information to and/or from said vehicles.

The system may further comprise a vehicle incorporating the computer program product described herein.

The system may further comprise a further vehicle carrying a device adapted to execute the computer program product as described herein.

According to another aspect of the present invention there is provided a method for regulating the battery usage of a range-extended vehicle, the method comprising: receiving a power usage plan for a trip itinerary; monitoring the state of charge of an on-board battery for powering said vehicle; and activating the range extender if the state of charge is lower than the corresponding level on the power usage plan.

The power usage plan may comprise a low state of charge at the end of the trip.

The power usage plan may comprise a linear decay of the state of charge of the battery.

The power usage plan may comprise a first section where the state of charge is substantially constant, and a second section wherein the state of charge follows a linear decay.

The range extender may be activated when the state of charge is at least substantially 5% lower than the corresponding level on the power usage plan.

The range extender may be activated when the state of charge is at least substantially 10% lower than the corresponding level on the power usage plan.

According to another aspect of the present invention there is provided a method for controlling a range extender in an electric vehicle, the method comprising: receiving trip information, retrieving at least one previous trip having trip information in common with the trip information, and having associated power usage information; and activating the range extender in dependence on said power usage information.

The method may further comprise: determining a power usage plan for said trip itinerary in dependence on the retrieved power usage information;

In the absence of sufficient trip information and/or power usage information, a default power usage plan may be determined.

The default usage plan may be one of: a recently used power usage plan, a commonly used power usage plan, a power usage plan with an early discharge phase and a later charge-sustaining phase.

The invention also extends to an apparatus for controlling a range extender in an electric vehicle substantially as described herein and/or with reference to the accompanying drawings.

The invention also extends to a method for regulating the battery usage of a range-extended vehicle substantially as described herein and/or with reference to the accompanying drawings.

The invention also extends to a method for controlling a range extender in an electric vehicle substantially as described herein with and/or reference to the accompanying drawings.

The invention also extends to a range-extended vehicle substantially as described herein and/or with reference to the accompanying drawings.

The invention extends to any novel aspects or features described and/or illustrated herein. Further features of the invention are characterised by the independent and dependent claims.

Any feature in one aspect of the invention may be applied to other aspects of the invention, in any appropriate combination. In particular, method aspects may be applied to apparatus aspects, and vice versa.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

The entire contents of U.S. Provisional patent application No. 61/736,050 relating to 'Predictive Range Extender Management' is hereby incorporated herein by reference in its entirety.

In this specification the word or can be interpreted in the exclusive or inclusive sense unless stated otherwise.

The invention extends to methods and/or apparatus substantially as herein described with reference to the accompanying drawings.

Purely by way of example, the present invention is now described with reference to the accompanying drawings in which.

Figure 3A:
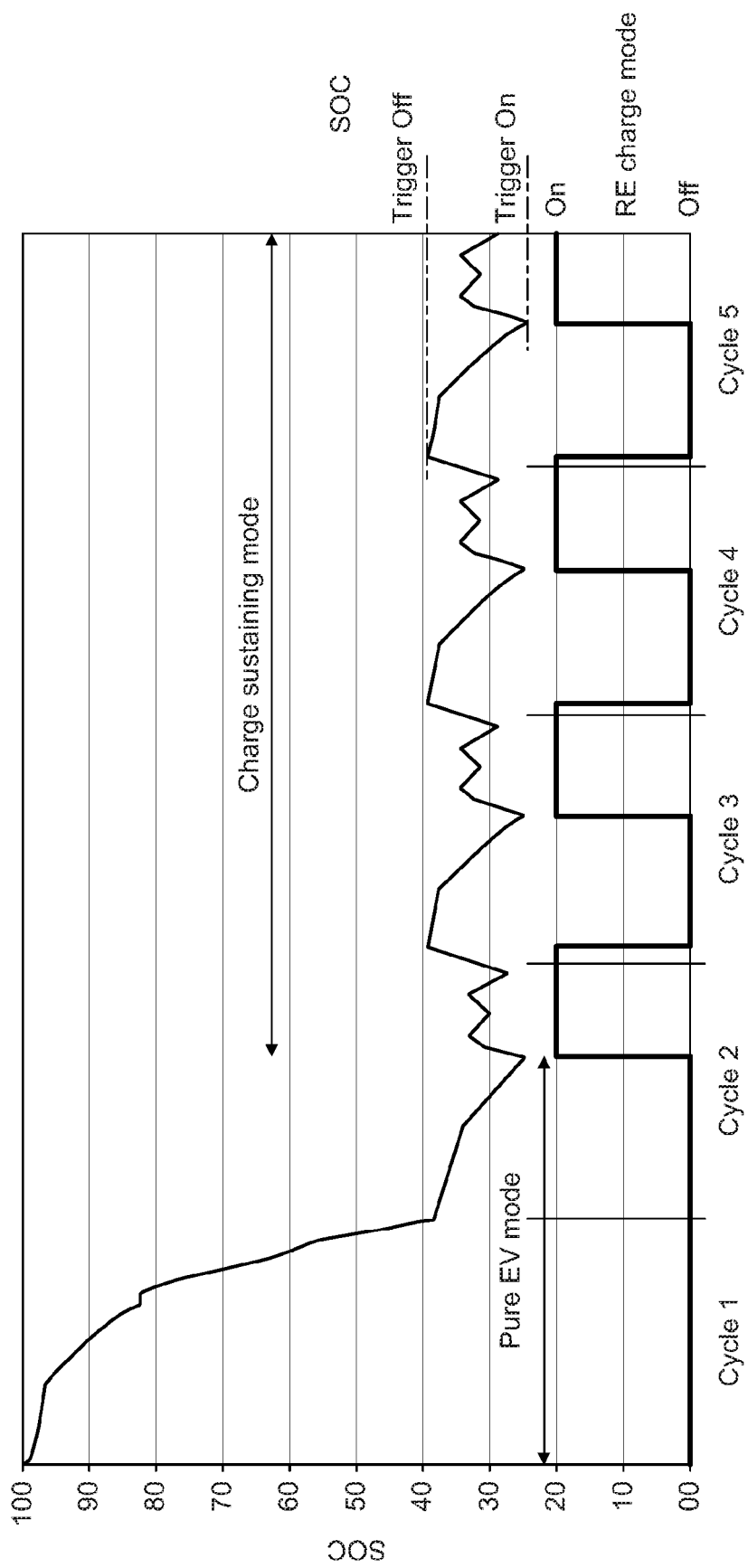
Figure 3B:
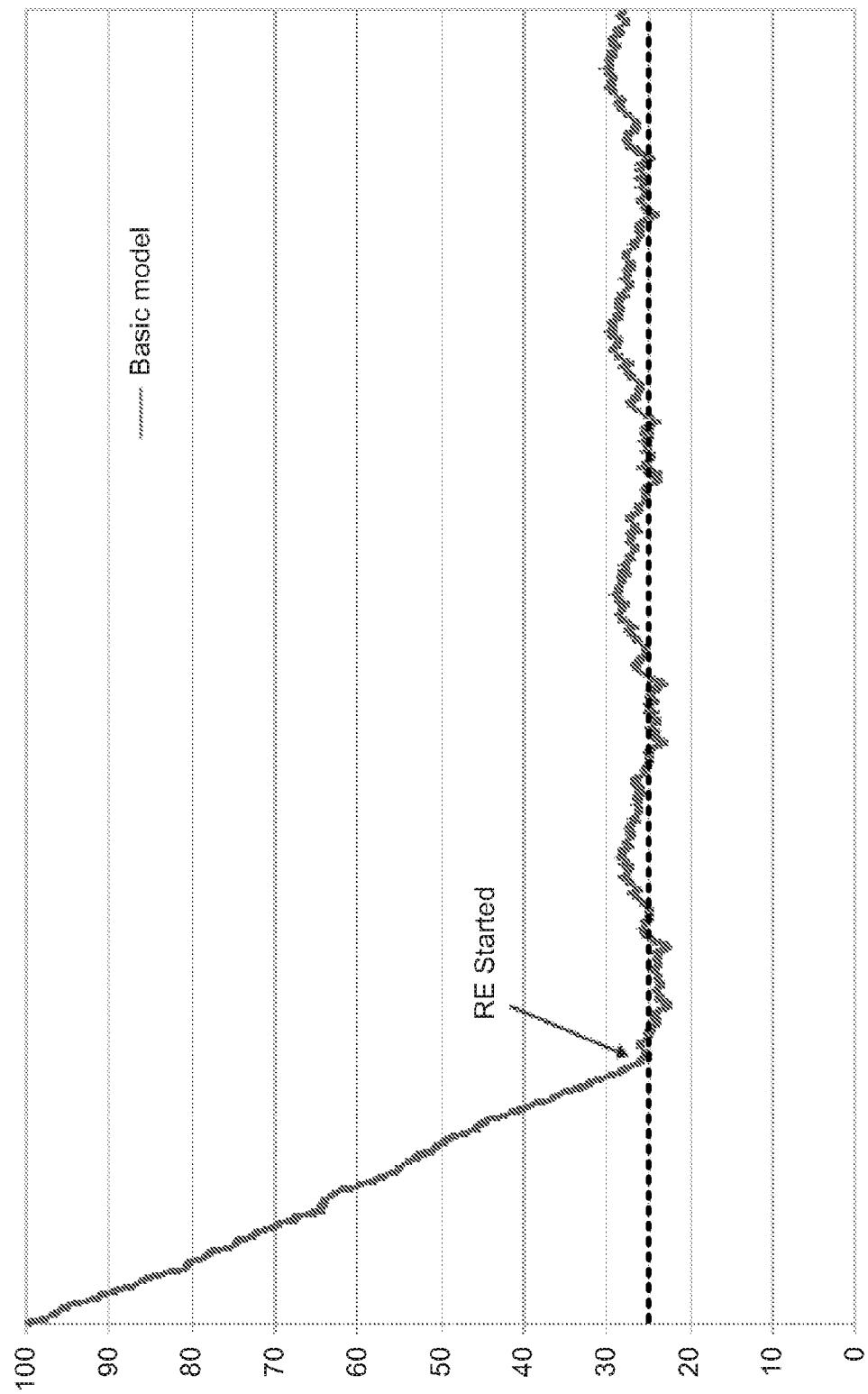
Figure 4:
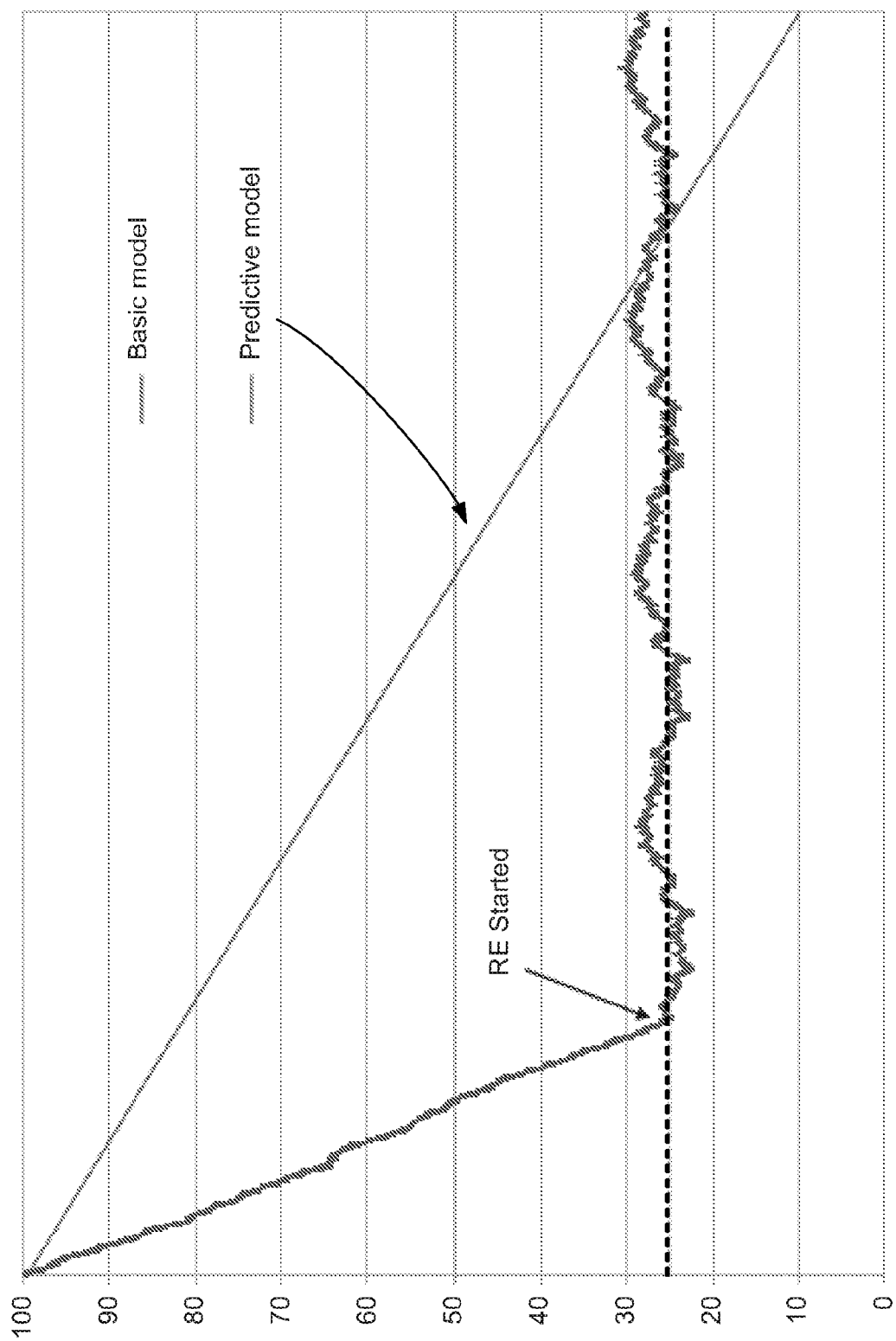
Figure 5:
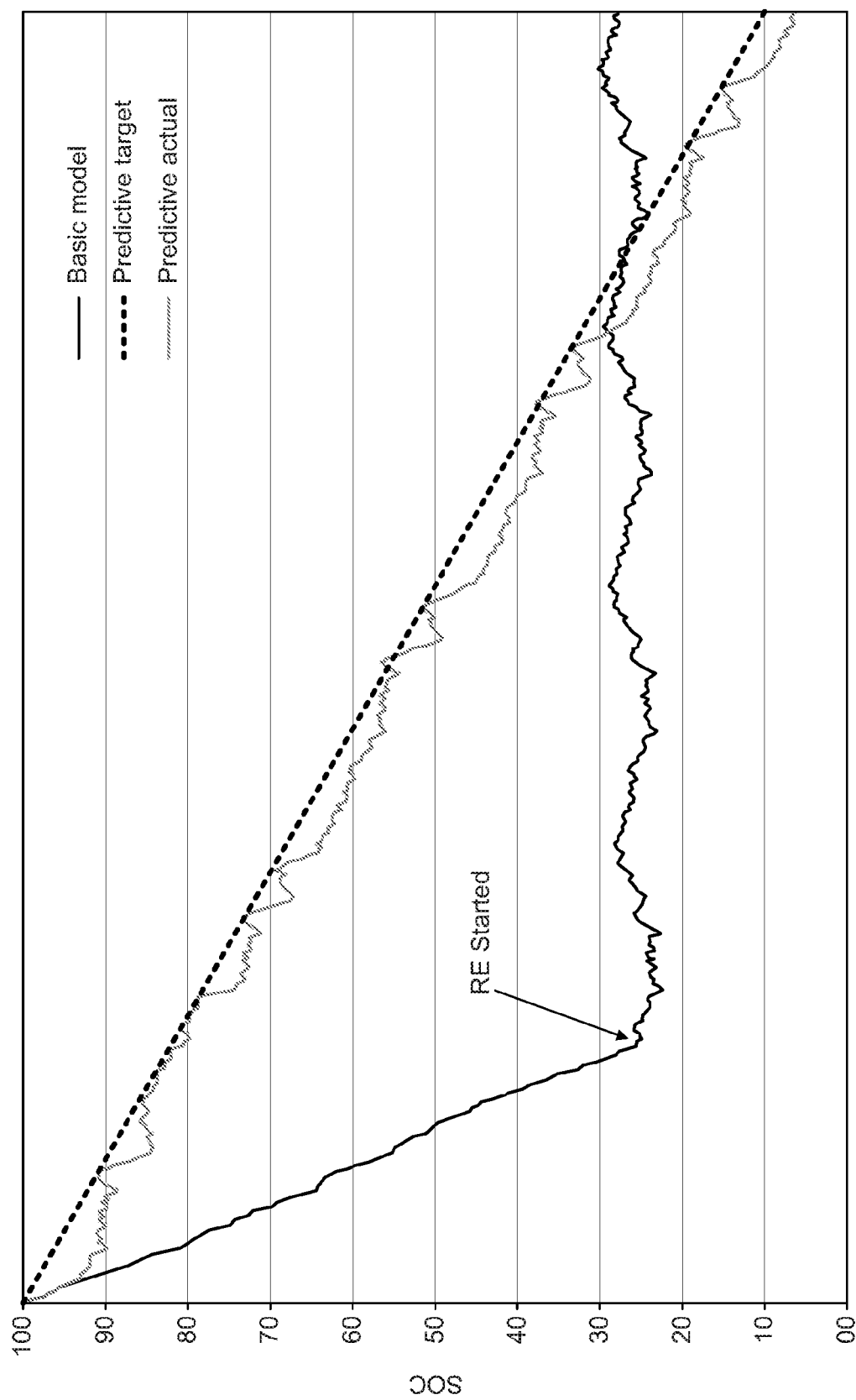
Figure 6:
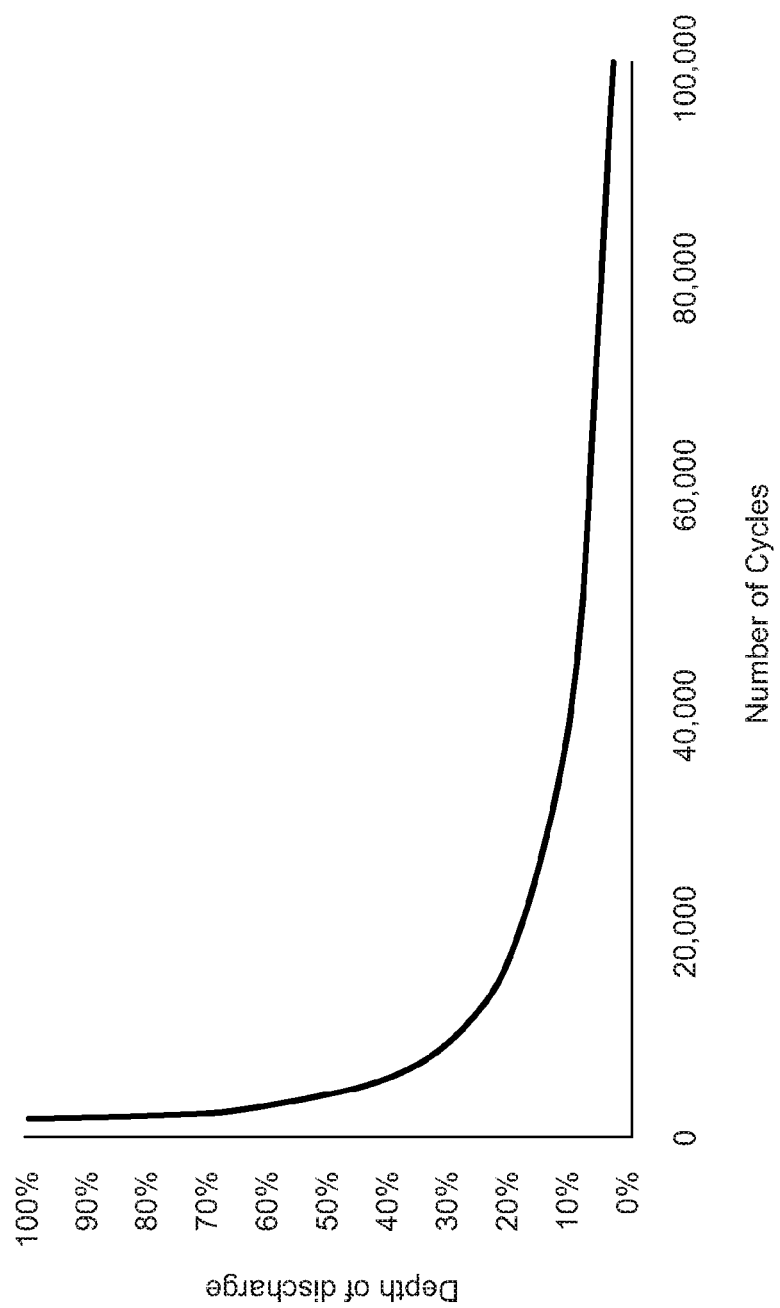
Figure 7A:
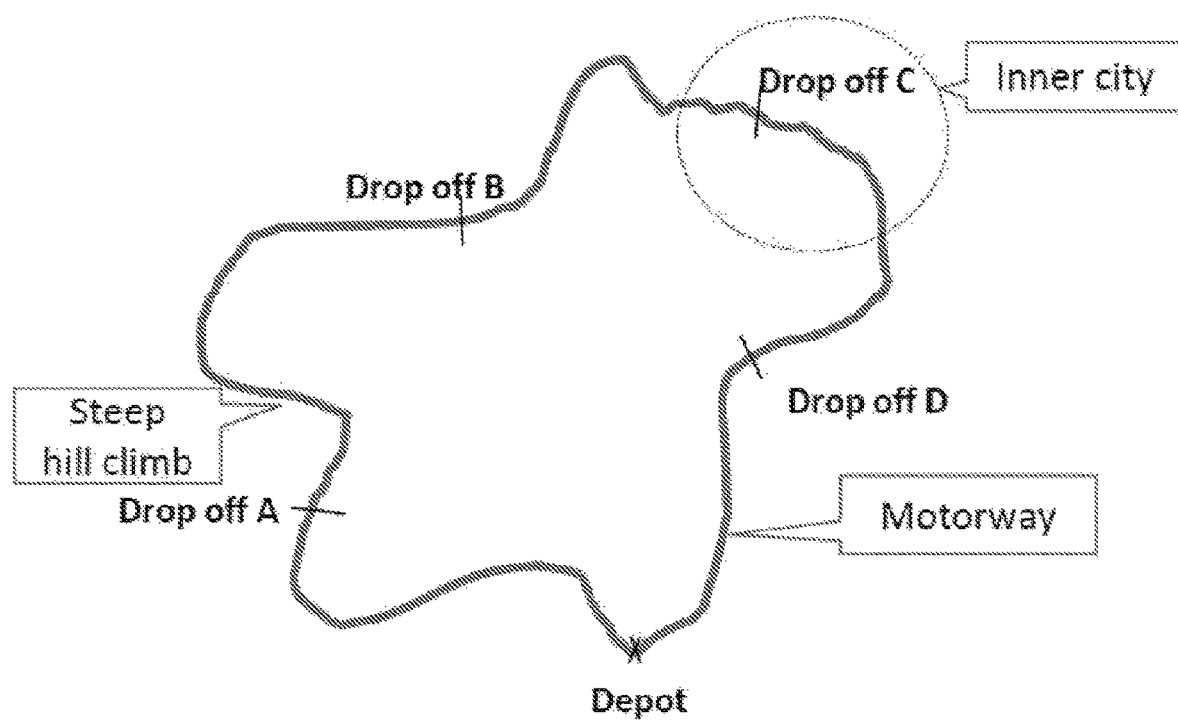
Figure 7B:
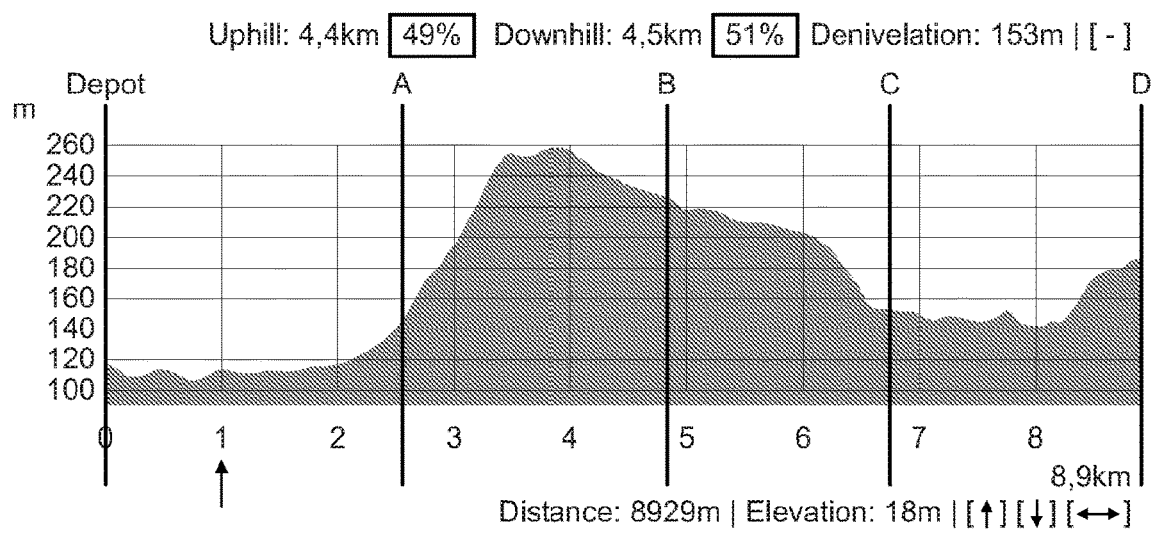
Figure 8:
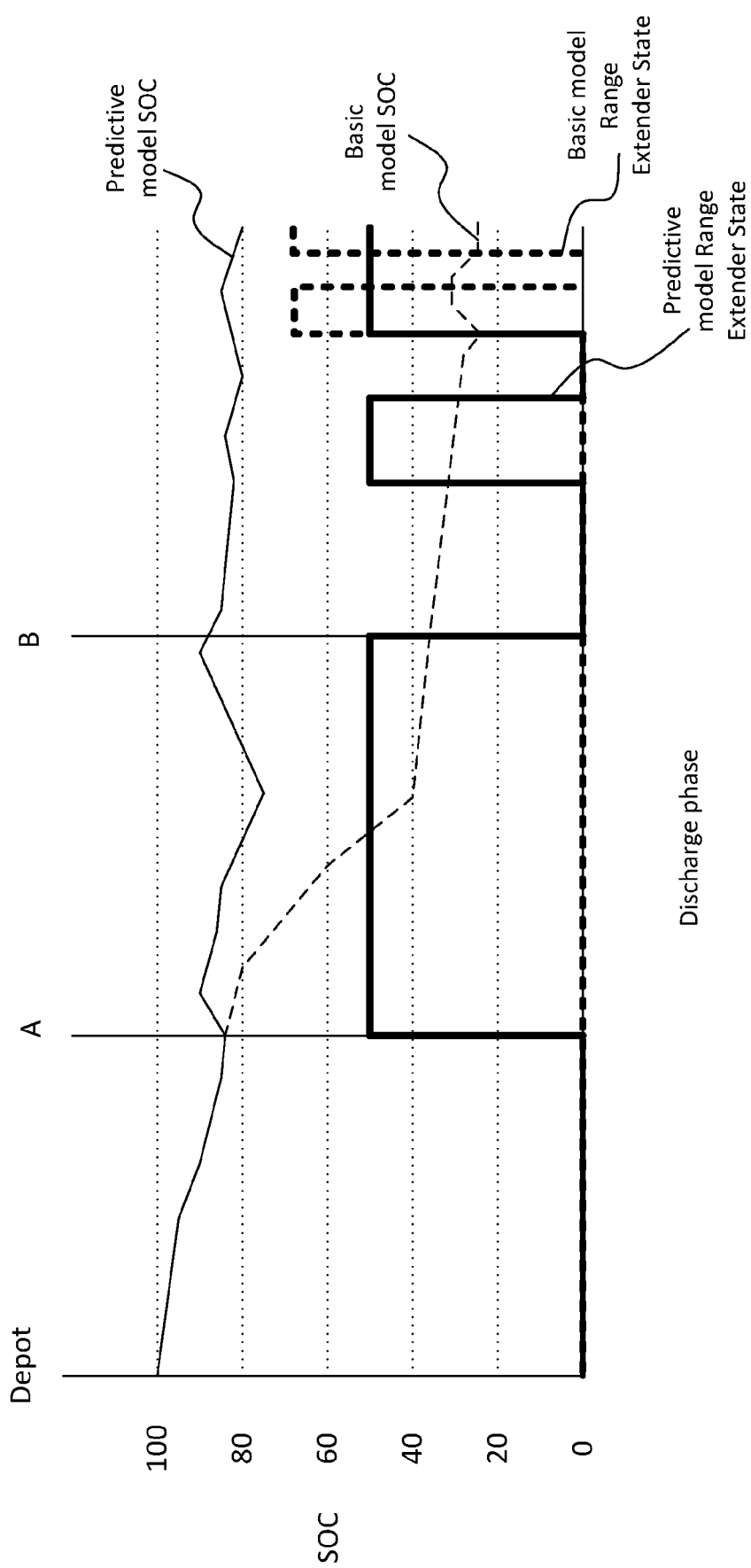
Figure 9:
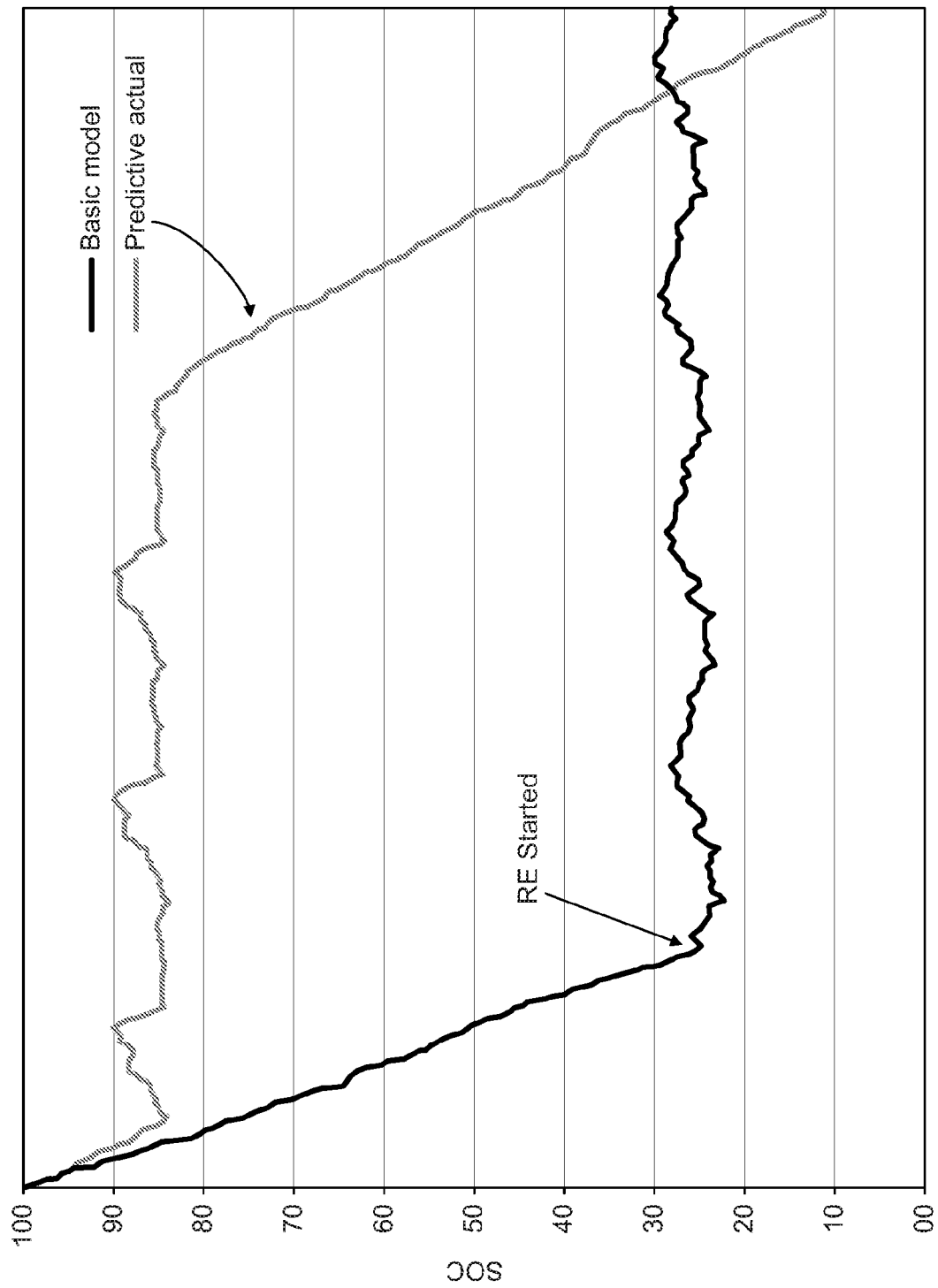
Figure 10:
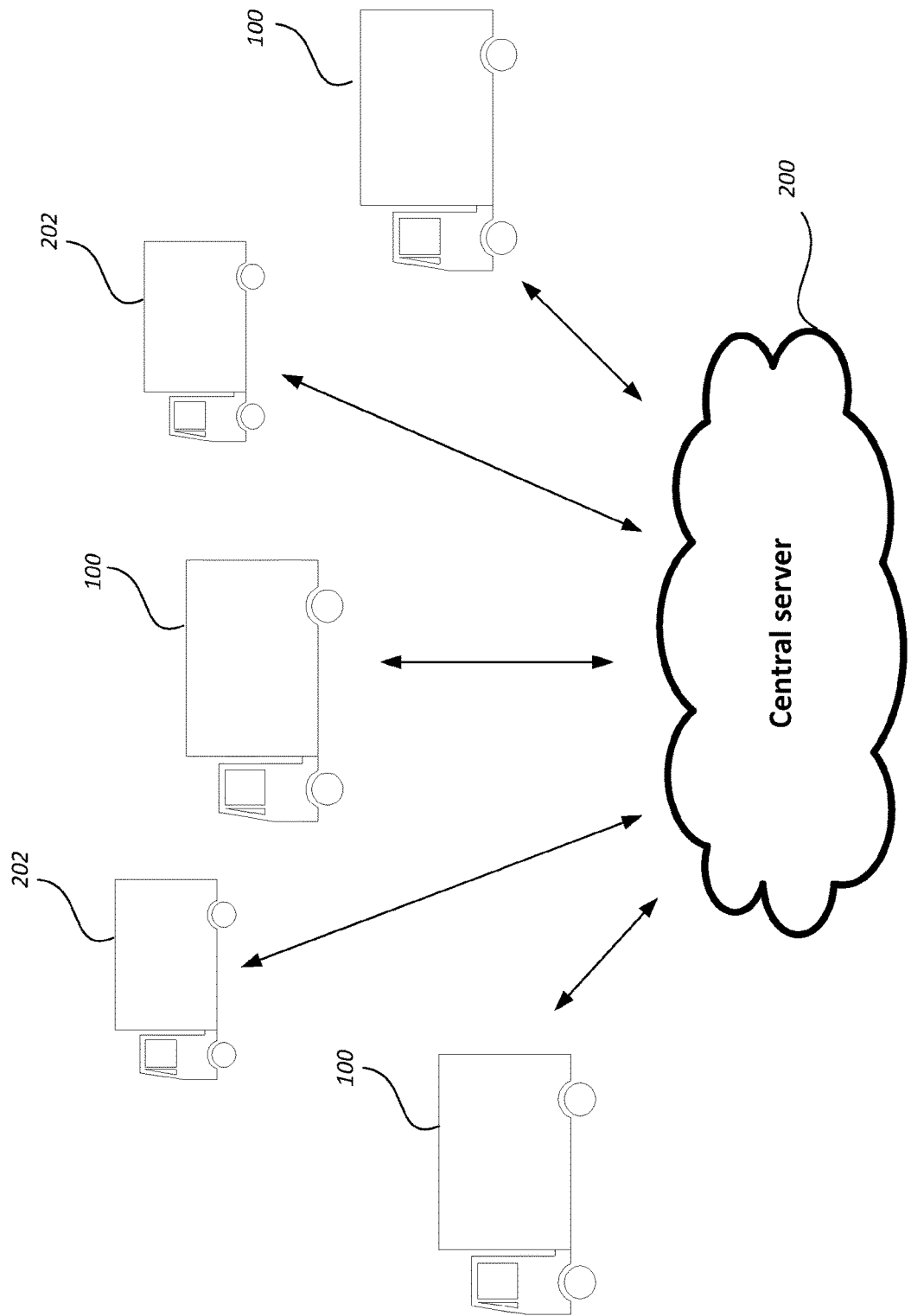

FIGS. 3(*a*) and (*b*) show prior art range-extender management graphs;

FIG. 4 shows a 'predictive' model superimposed over the 'basic' model of FIG. 3(*b*);

FIG. 5 shows the example target and actual predictive models superimposed over the basic model;

FIG. 6 shows the relationship between depth of discharge and number of cycles in a battery's life;

FIG. 7(*a*) shows an example route a vehicle may take;

FIG. 7(*b*) shows the profile of the route shown in FIG. 7(*a*);

FIG. 8 shows example states of charge and range extender usage for a section of the route of FIG. 7 for both the basic model and an embodiment of the present invention;

FIG. 9 shows an alternative discharge model superimposed over the basic model; and FIG. 10 shows an example system including a number of vehicles and a central server.

DETAILED DESCRIPTION

Figure 1:
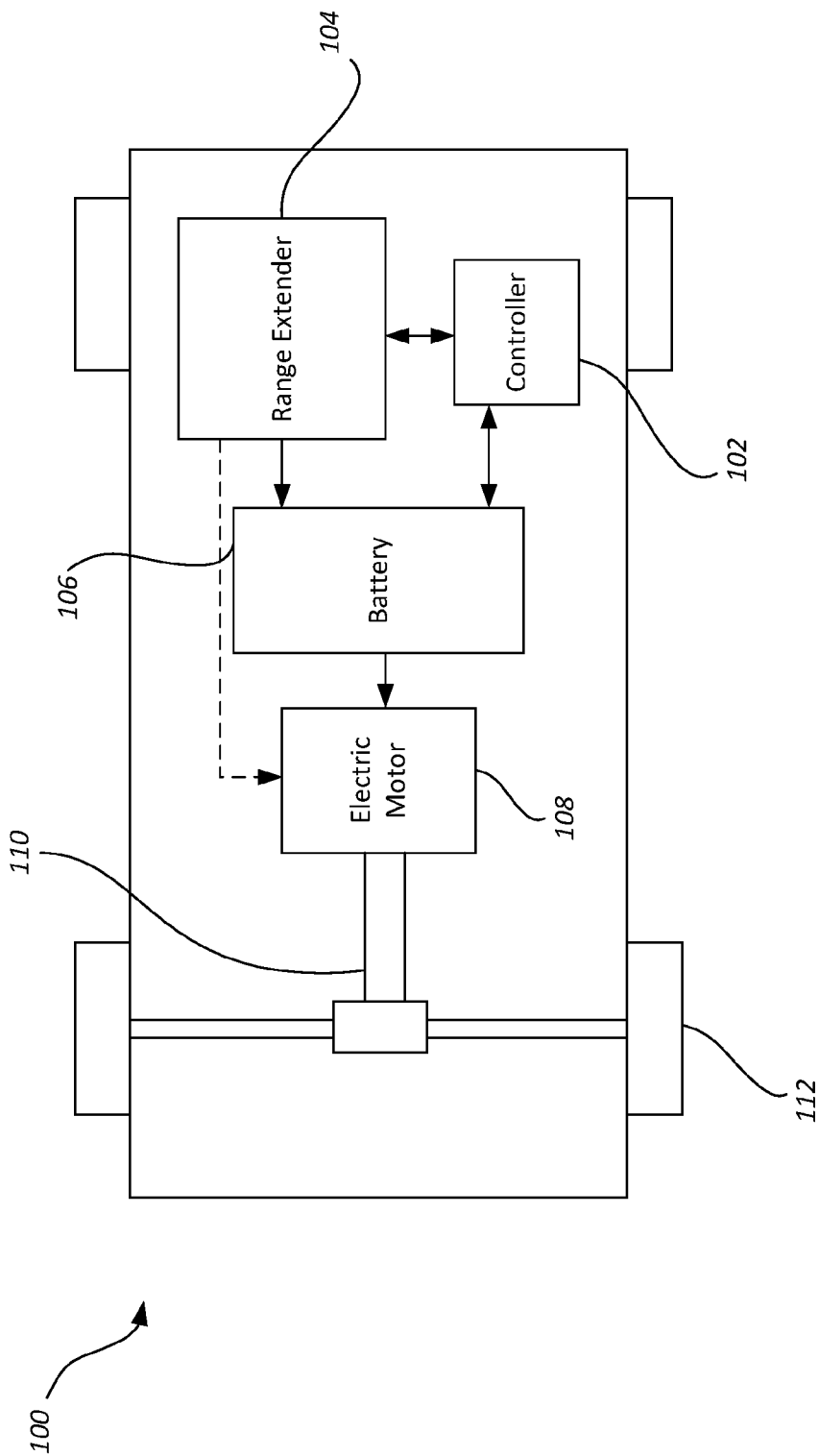
FIG. 1 is a schematic diagram of a range-extended electric vehicle.

A range extended electric vehicle 100 is shown schematically in FIG. 1. The vehicle includes an apparatus for activating a range extender 104 within the electric vehicle 100, in the form of a controller 102 connected to and in communication with the range extender 104 and a battery 106, typically in the form of a battery pack. The range extender 104 is a secondary source of power, for example a diesel internal combustion engine or hydrogen fuel cell, connected to an electric generator. The range extender is connected to the battery so as to re-charge it via the generator (the circuitry necessary for this has been omitted from the drawing for clarity). The range extender 104 (via the generator) may also directly power the electric motor 108; this is only performed in certain circumstances described in more detail below.

The battery 106 supplies power to an electric motor 108, which drives the wheels 112 via a transmission means such as a drive-shaft 110.

Figure 2:
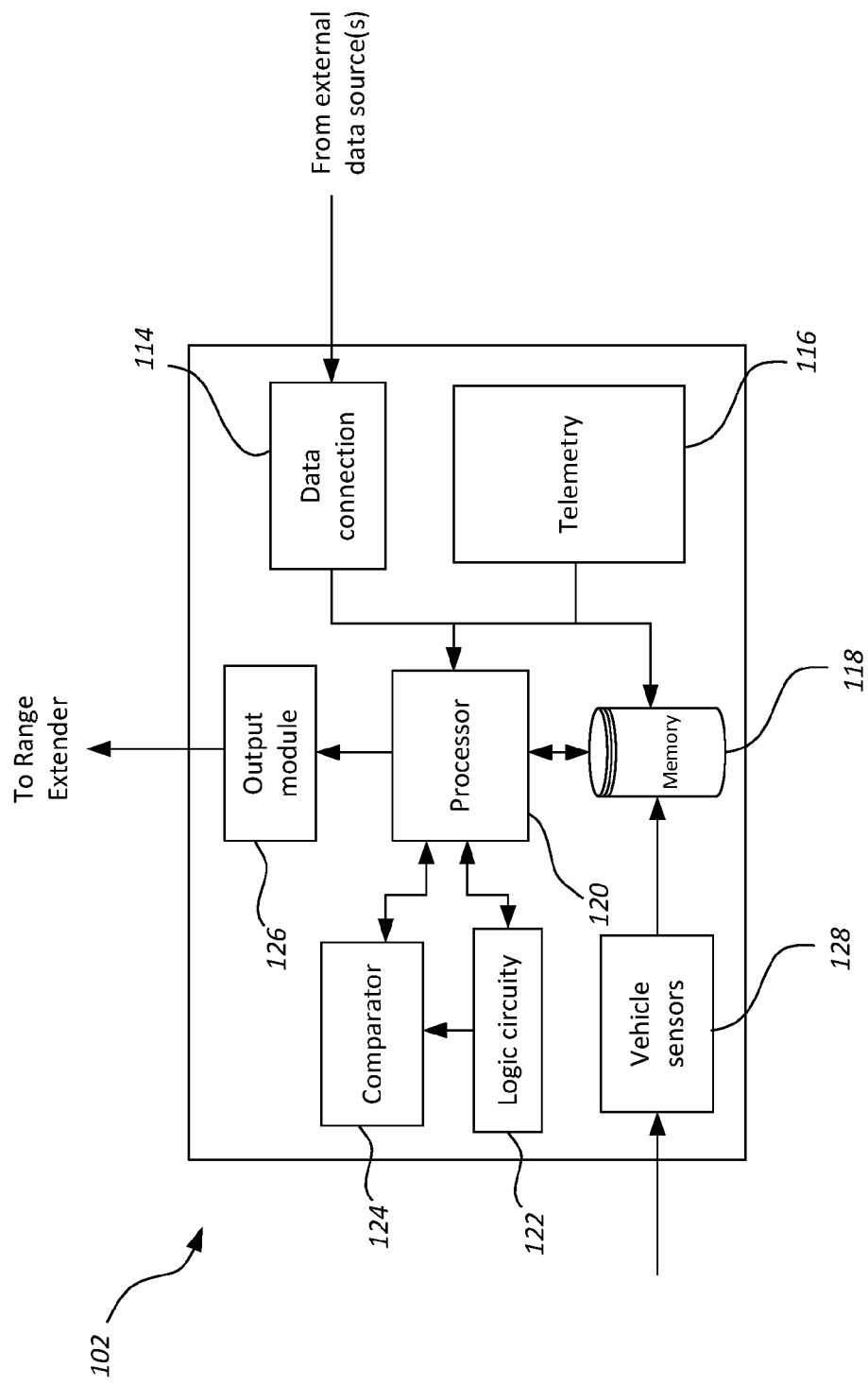
FIG. 2 is a schematic circuit-diagram of a controller for controlling the operation of a range extender.

FIG. 2 shows a schematic representation of the controller 102 capable of controlling the range extender 104 to follow a particular power usage plan (or predictive model). Such a plan may include an activation schedule for the range extender which is stored in a memory 118, so as to follow the desired plan. The controller 102 comprises a data connection 114 for receiving/retrieving data (such as trip itinerary information and power usage information) from external sources. This may be a physical connection, such as a Universal Serial Bus (USB) connection, or a wireless connection, such as General Packet Radio Service (GPRS), Global System for Mobile Communications (GSM), Universal Terrestrial Radio Access Network (UTRAN), Evolved UTRAN (E-UTRAN), Code Division Multiple Access (CDMA), Long Term Evolution (LTE), Worldwide Interoperability for Microwave Access (WiMax), or Bluetooth®.

The controller 102 further comprises a telemetry unit 116. This unit includes a package of sensory or measurement instruments operable to sense or detect and record various parameters relating to the vehicle and journey (further trip information). Examples of such instruments include: a Global Positioning System (GPS), accelerometer, temperature/weather sensors, motor monitoring devices, and devices that monitor power usage/battery health.

The data from these various instruments is stored in the local memory 118 with the aid of processor 118. Local memory 118 also comprises information relating to previous trips, such as power usage information from previous trips and/or activation schedules relating to previous trips. This information may have been imported to the controller 102 from an external source, determined from telemetric data based on a previous trip, or a combination thereof, and is used when determining whether or not to activate the range extender (i.e. in determining a power usage plan for a current trip). Such a power usage plan may be determined by processing data retrieved (from local memory or from an external source) on-board, or the processing of the data may be performed remotely (for example in the 'cloud') and transmitted to the device memory 118 via data connection 114. Logic circuitry 122 and comparator circuitry 124, with the aid of processor 120, determine if the conditions for activation of the range extender are met, and if so, the processor 120 sends a signal to the range extender via output module 126.

The controller 102 further comprises vehicle parameter sensors 128, which monitor parameters such as: the level of charge of the battery, battery state of health (Battery Management System) and motor speed. Such sensors may be connected to a bus (for example a CANbus (Controller Area Network bus) to allow communication between them and the controller 102). This information is stored in memory 118 and is used when determining whether or not to activate the range extender 104.

The controller 102 may further comprise user interface components such as a display screen and/or keypad for users to manually input data (for example, to identify the driver); these are not shown for clarity, and would typically be wirelessly connectable to the controller 102 and implemented in a separate computing device such as a smartphone or tablet. Alternatively or additionally, an application may be provided on a separate user device (such as a smartphone or tablet device) to record/receive data to be used by the controller.

FIGS. 3(*a*) and (*b*) show the state of charge vs time for a 5 cycle discharge test spanning a day's usage using the range extender basic model, and will be used as a reference and example in this detailed description.

By using predictive management as shown in FIG. 4, the range extender can be used where it is most efficient rather than at maximum power (for example). Furthermore the range extender can be used to relieve the battery pack during high discharge phases (at full/high power) and ensure the charge level of the pack is utilised to provide improved overall efficiency.

By reducing the end SOC to 10% (for example) as opposed to the basic model's typical 35% SOC, approximately 10 kWh of range extender generated power is saved. Instead cheaper plug in electric power is used at the next charge. This also reduces overall emissions as power-plant generated electricity is being used rather than range extender generated electricity.

Although the range extender may be on for a longer overall duration than in the basic model it will primarily be running at its most efficient—and will therefore use less fuel than the basic model. This will result in lower overall emissions and a reduction in running costs.

FIG. 4 is a simplified illustration showing target SOC against time (an example day's trip); a more realistic model is shown in FIG. 5 and described below.

The range extender is on at full power when a high current threshold has been exceeded (to relieve/de-stress the battery pack), otherwise it is on at maximum efficiency if pack SOC is below the target level. If the pack SOC is much less than the target level, then the range extender may be switched onto full power. The level at which the SOC is determined to be less than (<) the target is a parameter that can be set depending on the particular implementation, in one example, this is a level 5% lower (e.g. SOC is 75% when the target is 80%), Similarly, the level at which the SOC is determined to be much less than (<<) the target is also a parameter that can be set depending on the particular implementation, in one example, this is 10% lower (e.g. SOC is 70% when the target is 80%), If the pack SOC is greater than (>) the target level, then the range extender is switched off. The range extender may also be used at a low level when the vehicle is travelling at low speeds as at such times the noise of the range extender is most noticeable. Low speeds may be defined less than 30 miles per hour, more preferably less than 20 miles per hour. Table 1 below illustrates these various example operational modes:

TABLE 1

Example range extender operational modes

| State Of Charge/ Discharge | Range Extender operation | |
| --- | --- | --- |
| | High speeds | Low speeds |
| High current threshold exceeded | On - full power | NA |
| SOC < target level | On - maximum efficiency | On - low power |
| SOC << target level | On - full power | On - low power |
| SOC > target level | Off | Off |

One situation where the high current threshold may be exceeded is when battery power alone is not sufficient, such as when climbing a steep hill or during fast motorway driving. In such situations the range extender may be used to augment the battery to provide additional power. The amount of additional power, and hence the power output of the range extender, may be defined by the deficit in power.

The basic model range extender does not relieve the cells during high current discharge phases. Using the range extender at high current discharge phases (e.g. high speeds, up hills etc.) relieves the full (high) power needed from the cells alone and in some cases lengthens the life of the cells as lower current draws are better for cell lifetime, and improves the efficiency of the output (because cells drawing high power are less efficient).

Alternatively (or in addition), a whole day's range extender usage expectancy may be modelled and thus a more precise power usage plan can be determined so that the range extender is only used at the optimal times during the day. Such a plan comprises a desired end SOC. This alternative model is described in more detail below with reference to FIG. 9.

More Detailed Analysis/Prediction Modelling (Example)

FIG. 5 shows a graph of SOC against time for the 'predictive model' of FIG. 4 using data modelled for a range-extended vehicle. Without any range extender input the graph (SOC) decays at a ratio of 1:1.73. With 30 kW provided by the basic model range extender the SOC is increased, on average, at a ratio of 1:9.

These figures are used in the predictive model for comparison.

A 55 kW engine (for example) produces 26.7 kW at maximum efficiency (1500 rpm), this averages out as the same as the discharge cycle rate $$\left(30 \times \frac{8}{9}\right).$$

As a result, the graph will flatten (i.e. stay at a constant charge) when the predictive range extender is on at maximum efficiency.

A lower level of 5% below the predictive model has been used as a trigger point.

By analysing data from the graph of FIG. 5 we can see that the predictive model range extender is on for 93% of the time that the basic model range extender is on, in addition, the range extender is at maximum efficiency as opposed to full power, the power produced is also around 11% less than that of the basic model.

These three factors (running less of the time, running at higher efficiency and running at lower power) could contribute to a saving of around 20% over the basic model in the example provided.

By using telematics and location logging it is possible to predict high loads, 'back to base' energy requirements, and to predict when entering city limits in order to further tune the discharge profile. The more data used for prediction the more efficient the planning can be. Parameters which may affect prediction include; route, topography of route, expected speed on each segment of route, historic and current traffic, weather, changing payloads (and hence changing weight), stopping and starting and non-driving loads on the battery (e.g. cab heating, windshield wipers, lights or other electronic instrumentation) degradation (situation) of battery (State Of Health), and all other drivetrain/range extender components.

The system not only utilises the range extender and battery to determine the most efficient single-use, but also may take into account the long-term effects and costs. FIG. 6 shows the relationship between the 'depth of charge' (how much of the battery power is used on each run) and the number of useful recharges. The graph shows that for a higher depth of discharge, the fewer the number of recharges of the battery possible before the battery can no longer hold charge. Logging of the amount of charge left at the end of each day and the state of health (e.g. ability to sustain charge) of the battery results in the system modifying the desired end-of-day charge level so as to optimise the long-term cost of running the vehicle. This may coincide with optimising one-trip cost in situations where it is known the battery is due to be replaced, but in other situations, a plan resulting in a higher one-trip cost may be utilised so as to preserve the state of health of the battery.

It might not be necessary to know current payloads; instead, the system can detect actual current draw in different situations (speeds, accelerations etc.) and extrapolate from that the different loads/current draws in different (predicted) situations. Statistical analysis can identify ancillary loads such as on board refrigeration, as well as seasonal variations where extra cooling in summer or heating in winter will affect energy usage. Also knowing payload (current on vehicle and predicted changes during the day) can be used to fine tune the system.

Data may be logged from multiple periods and multiple vehicles (e.g. different vehicles of the same company) for constant optimization of the power usage plan. This data may be subsequently used to recommend more efficient routes or changes to the vehicle's hardware (e.g. installing a bigger battery or range extender).

Variances from the expected prediction may also be accounted for by the system, for example if the vehicle has to change route. These variations can also be handled by taking into account the likelihood of a variation (frequently occurring changes vs infrequent ones).

The GPS/telematics system can also identify the appropriate speed limit and apply speed regulation by means of regenerative braking when the speed limit is exceeded. This function could have a manual override for emergency situations and in cases of incorrect/corrupt data. The range extender may be limited to charging the battery above a certain value so that regenerative braking can always add to the SOC without overcharging the battery.

Using the range extender at maximum power during high current discharge phases will protect, and hence extend pack life, there will be a slight trade-off as a result of high depth of discharge as illustrated in FIG. 7.

The controller 102, including the telematics system, is able to identify the daily route (including topography and predicted speed as well as route deviation/new route identification), initial charge state, weather conditions (wind and temperature which may also effect non-driving loads such as lights, cab heater, air conditioning or windshield wipers), traffic, payload changes during the day and vehicle load in order to iterate calculations to give an end SOC of approximately 10% (example). This will be by means of on-the-fly recalibration of the predictive model as new, more recent (and potentially more relevant) data is available to provide a more precise power usage plan.

Alternative Discharge Profile

Rather than discharging the pack using a profile tending to linear down to the final 10% SOC (as seen in the previous model) the charge level may instead be maintained at a high level, with the final phase of the discharge being non sustaining (although high charge discharge would still be buffered). Effectively, this is changing the set, linear 'target SOC' shown in FIGS. 4 and 5 to a follow a different path, however, the general operation of the range extender described in Table 1 above may also apply when following this model.

In the examples shown in FIGS. 8 and 9, the (55 kW theoretical) range extender is ramped up to maximum efficiency when the charge level reaches, for example, 85% SOC. At maximum efficiency the range extender produces 26.7 kW. By ramping up to maximum efficiency we can protect the (cold at start) internal combustion engine.

The controller 102 is adapted to detect when to apply non sustaining mode.

High current discharges are buffered by the range extender (i.e. very steep gradients in the discharge curve are reduced by switching on the range extender).

The advantage of this discharge profile is that most work is done with the battery at high SOC, this protects the pack, extends pack life, avoids voltage drop and increases vehicle performance.

Geofencing/Back to Base

FIG. 7(a) shows an example route taken by a delivery vehicle, with FIG. 7(b) showing the associated profile of a section of the route. The route includes a steep hill climb, a number of drop-off points, and sections of inner-city and motorway driving. Such a route may be input into the system prior to departure, for example, by a user, or the route information may be imported directly from a server storing daily routes.

In use, this trip itinerary information is received and previous trips having some information in common (e.g. a trip yesterday had a 20 mile section on a motorway, Frank drove part of this route last week) are 'stitched' together to form this upcoming trip. The power usage information from such previous trips is then optionally adapted for this upcoming trip (which may be performed in dependence on and/or extrapolated from further previous trip information). A power usage plan for this upcoming trip is then generated and programmed into the controller memory 118 in the form of an activation schedule for the range extender. This processing may occur (i) on-board, whereby previous trip information is retrieved by the controller 102 from local memory 118 (ii) the controller may retrieve previous trip information from an external source, or (iii) the processing may be performed on a server 200 (see FIG. 10) and the controller 102 retrieves a complete power usage plan.

FIG. 8 shows the operation of the controller 102 when implementing a (predetermined) power usage plan over the first part of this route compared to the basic model. In the basic model, the first hill section uses up a significant proportion of the battery power, quickly bringing the SOC down to the trigger level for activation of the range extender (typically around 25%). This activates (at full power) to keep the level above this trigger level.

In contrast, when using the power usage plan, the range extender is activated during the first hill climb so as to maintain a high level of charge (in this example, 80-90%). The high level of charge is maintained for the first section of the journey by activating the range extender at its maximum efficiency. As the controller 102 has been programmed with a power usage plan for the day, it knows that a large proportion of the energy is required for the first section, and thus the range extender is activated accordingly. Maintaining a high level of charge has a number of advantages as mentioned above, but also provides more flexibility for changing journeys or situations where range extender usage is not desired (e.g. due to inner-city emission regulations or noise requirements during drop-offs) or high discharge rates are needed (e.g. the later motorway driving section).

An example full-day battery SOC graph is shown in FIG. 9. This illustrates the maintenance of a high level of charge up until the vehicle is returning to base.

One of the most critical variables in the predictive model is identifying when the vehicle is returning back to base—as this is the phase that allows the pack to be discharged to its final minimum State Of Charge ready to be recharged with comparatively cheap plug in electricity.

If a standard route is taken then the on-board telematics system can learn and identify when the vehicle is returning to base in order to switch out of charge sustaining mode (taking into account the expected charge needed to reach base with all the parameters taken into account, including, but not only, range). If routes are varied then a simple 'geofence' can come into effect, when the vehicle enters an area within a certain distance of the base (a 'geofenced' area) then again it is switched out of charge sustaining mode. A low level of SOC relief may be provided by the range extender during this phase, wherein high discharge rates are buffered for example. Furthermore, if a very low level of charge is reached, the range extender is activated so as to avoid completely draining the battery.

On the fly calculations of load and topography will ensure a minimum final State of Charge without affecting performance. Such calculations may involve looking a few minutes ahead to see if there are any features which may require additional power (such as hills or motorways).

If a pre-set route is changed, the SOC plan for the rest of the day may be recalculated and re-optimised (either onboard, or in the cloud), and thereby adjusting the activation schedule. This may involve using data recorded from the earlier part of the day (for example, the energy usage at particular speeds/gradients). Equally, real time telemetry may trigger a recalculation of the power usage plan, for example if it is detected that the weight of the vehicle is actually heavier than anticipated, the activation schedule may have to be altered so as to charge the battery for longer and/or more frequently. The frequency of recalculation is a factor that is a trade-off between processing power/energy expenditure and the utility of recalculation. In one embodiment, the power usage plan is only recalculated when a deviation from the original trip itinerary is detected (for example, a delivery truck taking an unexpected route).

If necessary, a final low rate charge sustaining mode can be provided in order to counter high discharge rates that would enable high output from the range extender during the otherwise non sustaining discharge phase.

Rather than a detailed map being provided to the controller 102, the controller 102 may merely be provided with information such as waypoints, changing payloads; or general route information such as the distance being driven in the inner city/motorway and the number of drop-offs. This information may be sourced directly from a separate pre-existing database, for instance, a logistics database. In one embodiment, a central logistics database contains route information for an entire fleet of vehicles. By using previous data collected from vehicles operating the same or similar routes, power usage plans for each vehicle can be calculated and exported to the individual controllers in each vehicle. If the system also includes live tracking capability, information such as current traffic, weather and other live conditions that may affect power usage, the power usage plans (or even the routes themselves) can be updated mid-journey. One example of a route change may be that one vehicle encounters significant traffic, so a vehicle that is due to enter that area is diverted onto a different route which would result in a lower energy expenditure.

Instead of entering the day's waypoints (or receiving them from the logistics system), the system may self-learn. A driver may drive around for a day (or multiple days) and that becomes the set point for a specific day's plan. This is particularly advantageous for repetitive routes, such as newspaper bundle deliveries. Multiple self-learned routes may be saved by the controller 102. The controller 102 may also pre-emptively account for the changing payload at different waypoints.

Such self-learning may be performed over an extended period of months or years of operational data. This would provide the controller 102 with historical information regarding particular sections, weather conditions or specific driver characteristics (e.g. Frank accelerates from standstill quickly; Sally sticks to 60 mph on motorways).

Another aspect of self-learning is where no information regarding the weight of various deliveries is provided, In such a scenario, the controller 102 may infer the weight of the vehicle (for example, a delivery vehicle) by comparing the performance as to a previous situation where the weight was known (for example, when the vehicle was empty and returning 'back to base'). This calibration would then allow for a more precise power usage plan to be calculated.

This route-learning may not necessarily occur in a range-extended vehicle, a suitable piece of hardware capable of measuring location, speed and/or acceleration and elevation (e.g. a smartphone or tablet with a suitable application) may be used to gather data.

FIG. 10 shows a system incorporating a number of range-extended vehicles 100, each incorporating a controller 102 as described above. Each vehicle 100 is in data communication with a central server 200. This data connection may be active only when the vehicle is within a certain range (e.g. in the garage) or it may be a long-range connection so that the vehicles 100 are able to transmit and receive data substantially all the time.

Each vehicle 100 logs telemetric data such as position, speed, acceleration, battery SOC, weather, drop-off locations and any other trip information to the central server 200. The central server 200 can then collate this data so as to produce a central database of previous trips which can be used to determine power usage plans for future trips, or to adjust the power usage plans of the vehicles currently on a trip. The latter scenario may apply if one vehicle reports low speeds at a particular location, indicating heavy traffic, the server 200 can then signal to other vehicles 100 to avoid this area, adjusting their route and power usage plan accordingly.

Further vehicles 202 which are not range-extended may also form part of the system, acting merely as data-loggers, for example vehicles having a smartphone or tablet with a suitable application (as described above) on board.

Mapping

The nature of the range extender is that it will produce power under full load. The generator provides a full power load for the internal combustion engine, the power from the generator being used either to charge the pack or assist with supply to the electric motor. The range extender is held at a pre-set rpm (revolutions per minute) (dependant on mode eq. high power, high efficiency or low power efficiency mode), the generator controller loads the range extender. This means the range extender needs only to be mapped at a set rpm (while the generator load may change).

The advantage of this is that fuel mapping is much simpler to develop, part load values are not critical, this saves development time and cost.

Any tuning of commercial off the shelf items can be kept to a minimum, with the focus instead being on efficiency and reduced emissions.

Alternative Discharge Modes

The above description primarily identifies operational points at maximum efficiency and at maximum power, however any point between these operational points may be used. Typically values for these would be over 90% efficiency of the generator and over 90% volumetric efficiency of the internal combustion engine, these combine to give the option of power on demand—which may be useful in non-charge sustaining mode.

Additionally, a low rpm start mode may be introduced to effectively give a soft start/warm up phase of the range extender.

In addition to normal telematics packages, some or all may be provided in a handheld package such as an iPhone®, iPad® or Android® device (with or without additional hardware).

The built-in GPS, accelerometers (inertial) and existing applications such as GPS and GIS (Geographical Information System) data may be utilised. The optimization computation could be done in the cloud (or partially in the cloud and partially on board). In addition it may be optimized with 'better driving and safer driving' packages, instructing drivers on more efficient (and/or safer) driving techniques.

The data in the cloud can be aggregated for multi vehicle or even multi fleet data mining, thus effectively 'crowd sourcing' data.

Another possible application of predictive range extender management takes into account external needs for non-usage of the range extender (e.g. city centers or early morning operations) in the whole day energy calculation.

Another possible application is to take into account additional (opportunistic) charging opportunities during a day. For example while a delivery truck is offloading payload at a location or when the vehicle returns to base over lunchtime.

The system is provided with a fail-safe whereby it reverts to a pre-set power usage plan in the event of lack of sufficient information or a failure. The pre-set plan may be a generic plan such as the basic model, or a plan that is likely to be correct such as one that has recently been used by that vehicle, or a plan that is commonly used by that vehicle or the fleet the vehicle is a part of.

It will be understood that the present invention has been described above purely by way of example, and modifications of detail can be made within the scope of the invention.

Reference numerals appearing in the claims are by way of illustration only and shall have no limiting effect on the scope of the claims.

The invention claimed is:

1. A method for a vehicle having a range extender, the method comprising:
   determining a power usage plan for a trip itinerary, comprising determining a target state of charge level for each point, of a plurality of points, on the trip itinerary by:
   for each point, of the plurality of points, on the trip itinerary:
      monitoring a state of charge of an on-board battery powering the vehicle;
      determining, for the point on the trip itinerary, a current state of charge;
      determining a target level on the power usage plan;
      determining a first threshold amount as a positive value;
      determining a lower threshold amount as a difference between the target level and the first threshold amount;
      determining a second threshold amount as a positive value greater than the first threshold amount;
      determining a second lower threshold amount as a difference between the target level and the second threshold amount;
      comparing the current state of charge with the lower threshold amount and the second lower threshold amount;
      switching on the range extender in response to detecting that the current state of charge is lower than the lower threshold amount, wherein switching on the range extender comprises activating the range extender in a high efficiency mode in which the range extender is operated at a preset rotational engine speed that provides maximum efficiency operation of the range extender;
   changing the range extender from the high efficiency mode to a maximum power mode in response to detecting, while the range extender is operating in the high efficiency mode, that the current state of charge is lower than the second lower threshold amount, and wherein the maximum power mode comprises operating the range extender at a preset rotational engine speed that provides maximum power operation of the range extender; and
   switching off the range extender in response to detecting that the current state of charge exceeds the target level on the power usage plan.

2. The method of claim 1, wherein the first threshold amount is a state of charge level which is substantially 5%, and the second threshold amount is a state of charge level which is substantially 10%.

3. The method of claim 1, comprising activating the range extender in response to detecting that a high current threshold has been exceeded.

4. The method of claim 1, comprising changing the range extender from the high efficiency mode or the maximum power mode to a low rotational engine speed in response to detecting, when the range extender is operating in the high efficiency mode or the maximum power mode, that a speed of the vehicle is below a threshold speed;
   wherein the threshold speed of the vehicle is about 30 miles per hour.

5. Apparatus for a vehicle having a range extender, the apparatus comprising:
   one or more processors;
   a non-transitory data storage medium coupled to the one or more processors and storing one or more sequences of instructions which, when executed by the one or more processors, cause performing:
      determining a power usage plan for a trip itinerary, comprising determining a target state of charge level for each point, of a plurality of points, on the trip itinerary by:
      for each point, of the plurality of points, on the trip itinerary:
         monitoring a state of charge of an on-board battery powering the vehicle;
         determining, for the point on the trip itinerary, a current state of charge;
         determining a target level on the power usage plan;
         determining a first threshold amount as a positive value;
         determining a lower threshold amount as a difference between the target level and the first threshold amount;
         determining a second threshold amount as a positive value greater than the first threshold amount;
         determining a second lower threshold amount as a difference between the target level and the second threshold amount;

comparing the current state of charge with the lower threshold amount and the second lower threshold amount;

switching on the range extender in response to detecting that the current state of charge is lower than the lower threshold amount, wherein switching on the range extender comprises activating the range extender in a high efficiency mode in which the range extender is operated at a preset rotational engine speed that provides maximum efficiency of operation of the range extender;

changing the range extender from the high efficiency mode to a maximum power mode in response to detecting, while the range extender is operating in the high efficiency mode, that the current state of charge is lower than the second lower threshold amount, and wherein the maximum power mode comprises operating the range extender at a preset rotational engine speed that provides maximum power operation of the range extender; and switching off the range extender in response to detecting that the current state of charge exceeds the target level on the power usage plan.

6. The apparatus of claim 5, wherein the power usage plan comprises a linear decay of the current state of charge of the on-board battery.

7. The apparatus of claim 5, wherein the power usage plan comprises a first section where the current state of charge is substantially constant, and a second section wherein the current state of charge follows a linear decay.

8. The apparatus of claim 5, wherein the first threshold amount is a state of charge level which is substantially 5% lower than the percentage of the corresponding target state of charge level on the power usage plan.

9. A range-extended vehicle comprising an apparatus according to claim 5, a battery pack, a range extender and an electric motor.

10. A method for a vehicle having a range extender, the method comprising:

determining a power usage plan for a trip itinerary, comprising determining a target state of charge level for each point, of a plurality of points, on the trip itinerary by:

for each point, of the plurality of points, on the trip itinerary:

monitoring a state of charge of an on-board battery powering the vehicle;

determining, for the point on the trip itinerary, a current state of charge;

determining a target level on the power usage plan;

determining a state of health of the on-board battery based on a measured ability to sustain charge;

determining a first threshold amount as a positive value;

determining a lower threshold amount as a difference between the target level and the first threshold amount;

determining a second threshold amount as a positive value greater than the first threshold amount;

determining a second lower threshold amount as a difference between the target level and the second threshold amount;

comparing the current state of charge with the lower threshold amount and the second lower threshold amount;

switching on the range extender in response to detecting that the current state of charge is lower than the lower threshold amount, wherein switching on the range extender comprises activating the range extender in a high efficiency mode in which the range extender is operated at a preset rotational engine speed that provides maximum efficiency operation of the range extender;

changing the range extender from the high efficiency mode to a maximum power mode in response to detecting, while the range extender is operating in the high efficiency mode, that the current state of charge is lower than the second lower threshold amount, and wherein the maximum power mode comprises operating the range extender at a preset rotational engine speed that provides maximum power operation of the range extender; and switching off the range extender in response to detecting that the current state of charge exceeds the target level on the power usage plan;

wherein the first threshold amount and the second threshold amount are determined based on the state of health of the on-board battery.

* * * * *